United States Patent Office 3,220,923
Patented Nov. 30, 1965

3,220,923
AQUEOUS INJECTABLE COMPOSITIONS AND METHODS FOR EFFECTING NARCOSIS
Werner Scholtan, Cologne-Stammheim, Germany, assignor to Farbenfabriken Bayer Aktiengesellschaft, Leverkusen, Germany, a corporation of Germany
No Drawing. Filed Aug. 12, 1963, Ser. No. 301,610
Claims priority, application Germany, Oct. 31, 1961, F 35,258
8 Claims. (Cl. 167—52)

This application is a continuation-in-part of copending application Serial No. 233,132 filed October 25, 1962, now abandoned.

The present invention relates to aqueous solutions of certain new and superior aryloxyacetic acid alkyl amides having hypnotic and narcotic properties and to their administration by intravenous injection.

It is known that aryloxyacetic acid alkyl amides when intravenously administered possess hypnotic and narcotic properties but only of short duration in comparison with barbituric acid derivatives previously used for such purpose and which latter have the serious disadvantages of a rapid drop in effectiveness after a relatively short period of time and by barbiturate "hangover," the said amides being free from those disadvantages. The amides, however, are practically insoluble in water and are generally distillable oily compounds. While solutions of these amides have heretofore been employed, as will be pointed out below, such non-aqueous solutions have disadvantages of their own and, hence, the problem of obtaining stable injectable aqueous solutions of these narcotically active amides has not been satisfactorily solved.

The narcotically active aryloxyacetic acid alkyl amides used in the present invention are the following novel compounds: 3 - methoxy-4-(N,N-diethylcarbamido-methoxy)-phenylacetic acid n-propyl ester, 3-methoxy-4-(N-ethoxy-N-ethylcarbamido-methoxy)phenylacetic acid n-propyl ester and 3-methoxy-4-(N-ethoxy-N-ethyl-carbamido-methoxy)phenylacetic acid isopropyl ester.

Solutions of these narcotically active amides have previously been made but only by using as solvents such substances as propylene glycol, butylene glycol, sodium salicylate, sodium benzoate, sodium hippurate, cyclohexyl salicylate, creosotes and salts of gallic acid and α-naphthylacetic acid, as well as mixtures thereof. Solutions produced in this manner have been found to be unsatisfactory because when used intravenously they cause irritation of the vein wall and, in addition, have the disadvantage that upon dilution with water or serum the active narcotic agent separates out in the form of droplets. In an effort to overcome these difficulties attempts have been made to emulsify other aryloxyacetic acid alkyl amides in water and while such emulsions have somewhat improved venous compatibility, they are difficult to make so that they have the requisite stability. Such emulsions must also be sterilizable and must not contain particles larger than 5 microns in size. This must hold true also during the entire storage period because the presence of larger sized particles is capable of causing blockage of the fine arterioles and can lead to serious or even fatal embolisms.

According to the present invention it has been found that clear stable aqueous intravenously injectable solutions of the above narcotically active amides can be produced through the use of a special solubilizing agent herein termed ethoxylated castor oil produced in accordance with German Patent 694,178 dated July 27, 1940, and constituted of a condensation product of castor oil with 20 to 40, preferably 30 to 35, moles of ethylene oxide per mole of castor oil (United States Patent No. 3,070,499).

The above-stated narcotically active amides when used in conjunction with the aforesaid solubilizing agent produce excellent clear and stable aqueous solutions which, when intravenously injected, have exceptional effectiveness without causing venous irritation or other undesirable secondary or side effect. The best results are obtained when about 2 to 10 parts by weight of the narcotically active amide are combined with about 10 to 20 parts by weight of the solubilizing agent and the resulting solution subsequently diluted with sufficient sterile water to make 100 milliliters. Alternatively, the narcotically active agent can be dissolved in a concentrated solution of the solubilizing agent and such concentrate subsequently diluted with the desired amount of sterile water. The solutions are clear and sterilizable and miscible with water in all proportions. They are free from venous incompatibility upon intravenous injection. The solubility of the narcotically active amide can be still further increased if desired by the addition of a previously known solvent or solubilizing agent although such is usually unnecessary.

The invention is illustrated by the following examples.

Example 1

5 grams of 3-methoxy-4-(N,N-diethylcarbamido-methoxy)-phenylacetic acid n-propyl ester are mixed with 20 grams of ethoxylated castor oil and the solution made up to 100 milliliters with water. An increase of the concentration of active material to 8.3 percent is possible if the solubilizer content is increased to 25 percent.

Example 2

3 grams of 3-methoxy-4-(N,N-diethylcarbamido-methoxy)- phenylacetic acid n-propyl ester are mixed with 10 grams of ethoxylated castor oil and the solution made up to 100 milliliters with water.

Example 3

4 grams of 3-methoxy-4-(N-ethoxy-N-ethylcarbamido-methoxy)-phenylacetic acid n-propyl ester are mixed with 20 grams of ethoxylated castor oil and the obtained solution made up to 100 milliliters with distilled water.

Example 4

4 grams of 3-methoxy-4-(N-ethoxy-N-ethylcarbamido-methoxy)-phenylacetic acid isopropyl ester are mixed with 20 grams of ethoxylated castor oil and the obtained solution made up to 100 milliliters with distilled water.

What is claimed is:

1. A stable aqueous injectable solution consisting essentially of about 2 to 10 parts by weight of a compound selected from the group consisting of 3-methoxy-4-(N,N-diethylcarbamido-methoxy)-phenylacetic acid n-propyl ester, 3-methoxy-4-(N-ethoxy-N-ethylcarbamido-methoxy)-phenylacetic acid n-propyl ester and 3-methoxy-4-(N-ethoxy - N - ethyl - carbamido - methoxy) - phenylacetic acid isopropyl ester and about 10 to 20 parts by weight of a condensation product of castor oil with 20 to 40 moles of ethylene oxide per mole of castor oil per 100 parts by volume of water.

2. A stable aqueous injectable solution consisting essentially of about 3 to 5 parts by weight of 3-methoxy-4-(N,N-diethylcarbamido-methoxy)-phenylacetic acid n-propyl ester and about 10 to 20 parts by weight of a condensation product of castor oil with 20 to 40 moles of ethylene oxide per mole of castor oil per 100 parts by volume of water.

3. A stable aqueous injectable solution consisting essentially of about 4 parts by weight of 3-methoxy-4-(N-ethoxy-N-ethyl-carbamido-methoxy)-phenylacetic acid n-propyl ester and about 20 parts by weight of a condensation product of castor oil with 20 to 40 moles of ethylene oxide per mole of castor oil per 100 parts by volume of water.

4. A stable aqueous injectable solution consisting essentially of about 4 parts by weight of 3-methoxy-4-(N- ethoxy-N-ethyl-carbamido-methoxy)-phenylacetic acid isopropyl ester and about 20 parts by weight of a condensation product of castor oil with 20 to 40 moles of ethylene oxide per mole of castor oil per 100 parts by volume of water.

5. A method of effecting narcosis which comprises intravenously injecting into a patient to be narcotized a stable aqueous injectable solution consisting essentially of about 2 to 10 parts by weight of a compound selected from the group consisting of 3-methoxy-4-(N,N-diethyl-carbamido-methoxy)-phenylacetic acid n-propyl ester, 3-methoxy-4-(N-ethoxy-N-ethyl-carbamido-methoxy) phenylacetic acid n-propyl ester and 3-methoxy-4-(N-ethoxy-N-ethyl-carbamido-methoxy)-phenylacetic acid isopropyl ester and about 10 to 20 parts by weight of a condensation product of castor oil with 20 to 40 moles of ethylene oxide per mole of castor oil per 100 parts by volume of water.

6. A method of effecting narcosis which comprises intravenously injecting into a patient to be narcotized a stable aqueous injectable solution consisting essentially of about 3 to 5 parts by weight of 3-methoxy-4-(N,N-diethyl-carbamido-methoxy)-phenylacetic acid n-propyl ester and about 10 to 20 parts by weight of a condensation product of castor oil with 20 to 40 moles of ethylene oxide per mole of castor oil per 100 parts by volume of water.

7. A method of effecting narcosis which comprises intravenously injecting into a patient to be narcotized a stable aqueous injectable solution consisting essentially of about 4 parts by weight of 3-methoxy-4-(N-ethoxy-N-ethyl-carbamido-methoxy)-phenylacetic acid n-propyl ester and about 20 parts by weight of a condensation product of castor oil with 20 to 40 moles of ethylene oxide per mole of castor oil per 100 parts by volume of water.

8. A method of effecting narcosis which comprises intravenously injecting into a patient to be narcotized a stable aqueous injectable solution consisting essentially of about 4 parts by weight of 3-methoxy-4-(N-ethoxy-N-ethyl-carbamido-methoxy)-phenylacetic acid isopropyl ester and about 20 parts by weight of a condensation product of castor oil with 20 to 40 moles of ethylene oxide per mole of castor oil per 100 parts by volume of water.

References Cited by the Examiner

UNITED STATES PATENTS

| | | | |
|---|---|---|---|
| 2,911,440 | 11/1959 | Thuiller | 167—52 |
| 2,948,754 | 8/1960 | Litvan | 167—52 |
| 3,010,995 | 11/1961 | Litvan | 167—52 |
| 3,010,996 | 11/1961 | Litvan | 167—52 |
| 3,012,936 | 12/1961 | Stoll | 167—52 |
| 3,027,407 | 3/1962 | Major | 167—52 |
| 3,044,931 | 7/1962 | Holstius | 167—52 |
| 3,070,499 | 12/1962 | Mullins | 167—58 |
| 3,086,978 | 4/1963 | Hiltman et al. | 167—52 |
| 3,113,073 | 12/1963 | Grim | 167—65 |

FOREIGN PATENTS 1,150,090   6/1963   Germany.

JULIAN S. LEVITT, *Primary Examiner.*

FRANK CACCIAPAGLIA, JR., *Examiner.*